July 17, 1962 G. ZANETTI-STRECCIA 3,044,359
REARVIEW MIRROR FOR VEHICLES
Filed Sept. 8, 1959
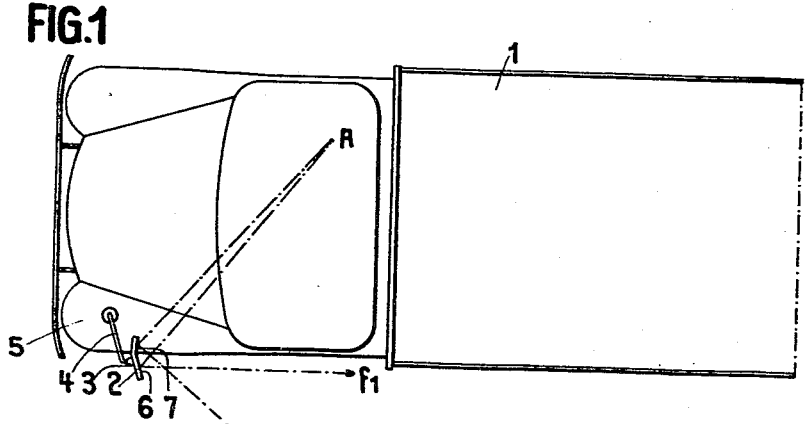
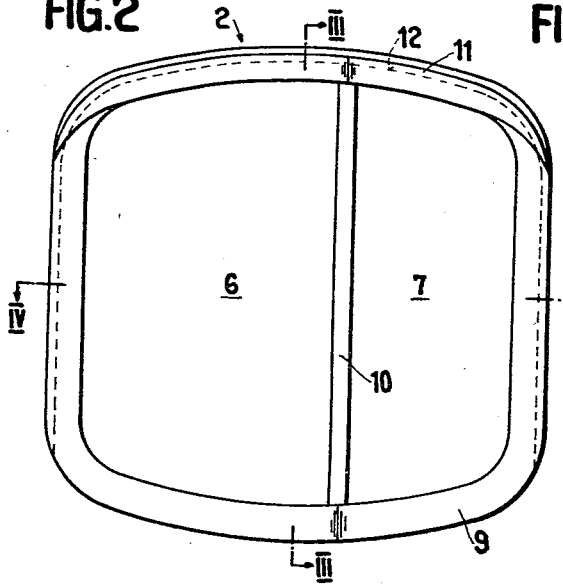
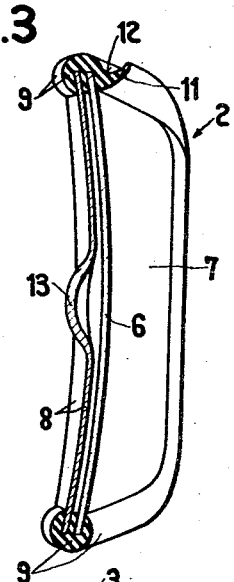
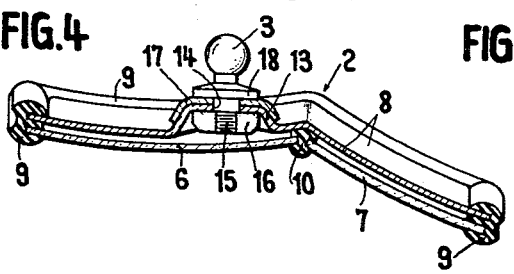
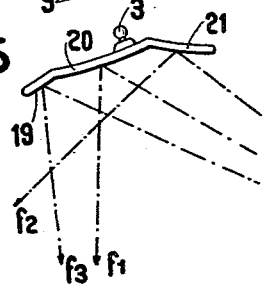
INVENTOR
Giuseppe Zanetti-Streccia
BY
*Imirie & Smiley*
ATTORNEYS United States Patent Office 3,044,359
Patented July 17, 1962

3,044,359
REARVIEW MIRROR FOR VEHICLES
Giuseppe Zanetti-Streccia, Mittelstrasse 12,
Bern, Switzerland
Filed Sept. 8, 1959, Ser. No. 838,748
Claims priority, application Switzerland Sept. 8, 1958
2 Claims. (Cl. 88—86)

The present invention relates to a motor vehicle, and more particularly to a heavy motor vehicle such as a lorry, including a rearview mirror means comprising at least two convex mirrors, arranged at the same level and held in a single armature, the said mirrors being inclined in relation to each other so that the first mirror enables the driver to see in a backward direction substantially parallel to the axis of the vehicle and the second mirror enables the driver to see in a backward direction at an angle with the said axis.

Motor vehicles of the above-mentioned type are already known. It has been proposed, for instance, to arrange a rearview mirror means having two mirrors within the driver's cab, substantially before the eyes of the driver, so that backward vision can be obtained only through the back-window of the said cab. If a back-window is not provided, as it is generally the case in the lorries, such a rearview mirror system is of no use.

The said drawback has been overcome by providing a rearview mirror means consisting of two mirrors arranged at an angle greater than 180° and mounting it outside the vehicle. However, the room taken up in the direction of the width of the vehicle is greater than with a single conventional rearview mirror, which can cause accidents.

The present invention aims at overcoming this drawback by the fact that both mirrors of the rearview mirror means form between each other an obtuse angle less than 180° and that the rearview mirror means is mounted on the vehicle in such a point that the first mirror occupies the normal position, outside the vehicle, of a conventional rearview mirror consisting of a single mirror, whereas the second mirror is situated wholly within the overall dimension of the vehicle in the direction of the width thereof. Due to this arrangement, no part of the rearview mirror means projects beyond measure out of the vehicle and any risk of accident is thus avoided.

The accompanying drawing shows, by way of example, one embodiment and a modified form of the invention.

FIG. 1 is a top view of a lorry in accordance with the invention.

FIG. 2 is a front view of the rearview mirror means, at an enlarged scale.

FIG. 3 is a cross-sectional view taken along the line III—III in FIG. 2.

FIG. 4 is a cross-sectional view taken along the line IV—IV in FIG. 2.

FIG. 5 is a top view of a modified embodiment, at a scale somewhat reduced with respect to FIGS. 2 to 4.

Reference being had to FIG. 1, there will be seen a lorry 1 on which is mounted a rearview mirror means generally denoted by the numeral 2. The mirror means 2 is mounted in the conventional manner, by means of a ball-head 3, at the free end of a rod 4 fixed to a front wing 5 of the lorry 1. The eye of the driver is assumed to be situated as at A.

The mirror means 2 consists of two convex mirrors 6 and 7, arranged side by side at the same level and held in a single armature 8. The said mirrors 6 and 7 form between them an obtuse angle less than 180°, as best shown in FIG. 4. The mirror means 2 is surrounded by a frame 9 made of rubber or another similar material. The frame 9 is provided with two inner grooves parallel to each other, into which are fitted the mirrors 6, 7 and the armature 8, respectively. The adjacent vertical edges of the mirrors 6 and 7 enter a bead 10 made of rubber or another similar material. The armature or back plate 8, made for instance of a light metal such as aluminum, has approximately the same shape as the mirrors 6 and 7, so that a cushion of air is left between the armature 8 and the mirrors 6, 7. The top portion of the frame 9 is provided with a hood portion 11 projecting above the mirrors, a groove or drain 12 being formed in the said hood portion 11 for draining the water in case of bad weather. The arrangement described of the mirrors 6 and 7 in the frame 9 guarantees a good watertightness and the mirrors are held firmly, but resiliently.

The armature 8 has a portion 13 projecting backwards (FIGS. 3 and 4). The portion 13 has a bore 14 traversed by a threaded stem 15 rigidly connected with the ball-head 3 and engaging a nut 16. A reinforcing washer 17 is inserted between the portion 13 of the armature 8 and a shoulder 18 of the stem 15.

The rearview mirror means 2 is mounted on the vehicle 1 (FIG. 1) in such a manner that the mirror 6 gives to the driver the conventional backward vision, in a direction $f_1$ substantially parallel to the axis of the vehicle 1, i.e. to the direction of motion of the vehicle 1. The mirror 7, due to its inclination in relation to the mirror 6, gives to the driver the backward vision, in a direction $f_2$ making an angle of about 40° with the axis of the vehicle 1. This arrangement is particularly useful in the case of cross-roads in which the roads do not form right angles between them. Let us note, in addition, that the passenger placed by the side of the driver can see in the mirror 7 about the same image as that seen by the driver in the mirror 6 and thus he can give to the driver useful indications, specially upon overtaking or shunting.

As shown in FIG. 1, the mirror 6 has the usual position, outside the vehicle, of a conventional rearview mirror consisting of a single mirror, whereas the second mirror 7 situated entirely within the overall dimension of the vehicle, in the direction of the width thereof. The mirror means 2, therefore, does not project outside the vehicle to a greater extent than a conventional rearview mirror consisting of a single mirror, which allows its general use without increasing the risk of accident. It is even possible, in accordance with the invention, to give the mirror 6 a width which is less than that of a conventional rearview mirror consisting of a single mirror. As a matter of fact, if the mirror 7 is given an appropriate inclination in relation to the mirror 6, the driver will see in the right-hand portion of the mirror 7 the image that he would see in the left-hand portion of a conventional rearview mirror consisting of a single mirror. Under these conditions, the rearview means 2 projects outside the vehicle 1 to a less extent than a standard rearview mirror having a single mirror.

If the seat of the driver of the vehicle 1 is situated at the left, instead of being placed at the right side as shown in FIG. 1, a rearview mirror means of a shape symmetrical to that of the rearview mirror means described and shown will be used.

The mirror 6 has preferably a width lying between 10 and 13 cm., whereas the mirror 7 has a width of about 7 cm. The common height of the mirrors 6 and 7 is about 17 cm.

In the modified embodiment shown in FIG. 5, the rearview mirror means comprises three mirrors 19, 20 and 21 instead of two as in the embodiment described above. The mirror 21 corresponds to the mirror 7 of FIG. 1 and enables the driver to see in the direction $f_2$, whereas the mirror 6 is here replaced by the mirrors 19 and 20, these mirrors 19 and 20 forming with each other an obtuse angle of less than 180° and having together the same width as the mirror 6 so as not to increase the portion of the rearview means projecting outside the vehicle. By way of example, the mirrors 19, 20 and 21 may have a width of 3, 10 and 7 cm., respectively. The mirror 20 gives a backward vision in the direction $f_1$, as the mirror 6 of FIG. 1, and the additional mirror 19 enables the driver to see in a direction $f_3$ what lies behind the vehicle. The chain-dotted lines drawn in the right-hand portion of FIG. 5 are supposed to converge at the eye of the driver.

Instead of being fixed to one of the front wings of the vehicle, the rearview means described might as well be fixed to the wall of the driver's cab, particularly in the case of a vehicle with a driver's cab placed in the foremost position of the vehicle.

What I claim is:

1. The combination of a motor vehicle and a rearview mirror device, said device comprising at least two slightly convex mirrors for increase of field of view and reduction of glare disposed in substantially horizontal alignment and held in a single frame, the first mirror being at least as large in horizontal dimension as the second mirror, said mirrors being positioned in inclined relation to each other so that the first mirror enables the driver to see in a backward direction substantially parallel to the axis of the vehicle and the second mirror enables the driver to see in a backward direction at an angle with the said axis, said first and second mirrors forming between each other an obtuse angle less than 180°, and said device being mounted on the exterior of the vehicle at such a point that the first mirror occupies the normal position, outside of the vehicle, of a conventional single rearview mirror and the second mirror is disposed inwardly of the first mirror and wholly within the overall dimensions of the vehicle in the direction of the width thereof.

2. The combination according to claim 1 in which the said frame of the mirror device is provided with a projecting hood portion formed wth an upper drain for channeling water away from the device.

References Cited in the file of this patent

UNITED STATES PATENTS

| | | |
|---|---|---|
| 1,893,245 | Ritz Woller | Jan. 3, 1933 |
| 2,257,510 | Mote | Sept. 30, 1941 |
| 2,279,751 | Hensley | Apr. 14, 1942 |
| 2,514,989 | Buren | July 11, 1950 |
| 2,649,028 | Lenta | Aug. 18, 1953 |
| 2,663,225 | Blan | Dec. 22, 1953 |
| 2,691,920 | Curcuru | Oct. 19, 1954 |
| 2,705,904 | Tagliaferri | Apr. 12, 1955 |

FOREIGN PATENTS

| | | |
|---|---|---|
| 558,481 | Great Britain | Jan. 6, 1944 |